Feb. 7, 1961  R. D. ACTON  2,970,655
STROKE CONTROLS FOR HYDRAULIC SYSTEMS
Filed July 23, 1956  4 Sheets-Sheet 1

INVENTOR.
RUSSEL D. ACTON

Feb. 7, 1961 R. D. ACTON 2,970,655
STROKE CONTROLS FOR HYDRAULIC SYSTEMS
Filed July 23, 1956 4 Sheets-Sheet 2
FIG-6
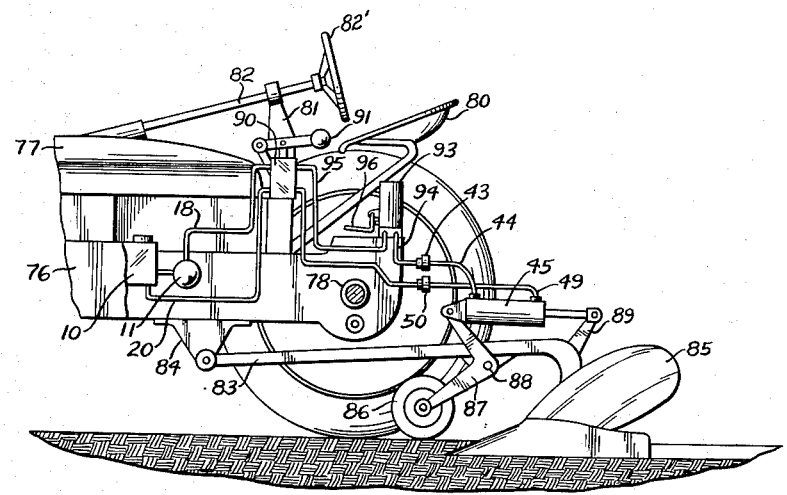
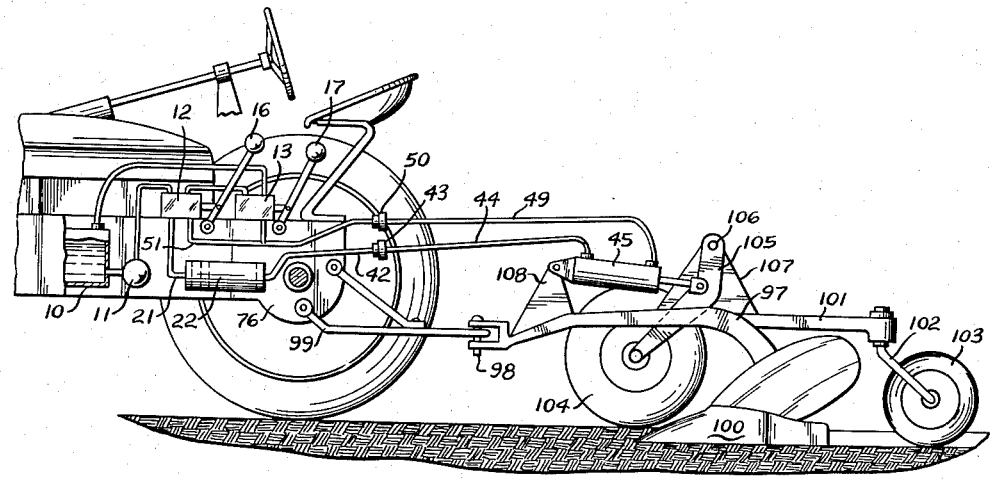
FIG-7
*INVENTOR.*
RUSSEL D. ACTON Feb. 7, 1961 R. D. ACTON 2,970,655
STROKE CONTROLS FOR HYDRAULIC SYSTEMS
Filed July 23, 1956 4 Sheets-Sheet 3
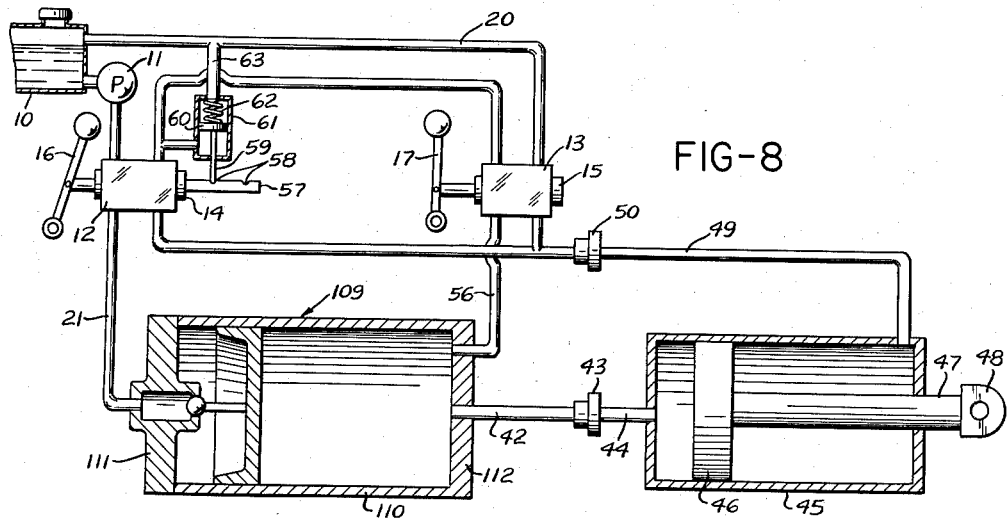
INVENTOR.
RUSSEL D. ACTON Feb. 7, 1961

R. D. ACTON 2,970,655

STROKE CONTROLS FOR HYDRAULIC SYSTEMS

Filed July 23, 1956

INVENTOR.
RUSSEL D. ACTON

United States Patent Office 2,970,655
Patented Feb. 7, 1961

2,970,655

STROKE CONTROLS FOR HYDRAULIC SYSTEMS

Russel D. Acton, Joliet, Ill.
(1219 Robinson St., Danville, Ill.)

Filed July 23, 1956, Ser. No. 599,621

36 Claims. (Cl. 172—316)

This invention relates to a hydraulic power device particularly adapted for use with tractors for the control of implements connected thereto. More specifically it relates to a hydraulic control system for tractors utilizing a reversible hydraulic motor for positioning implement parts and to stop means for limiting movement of the motor.

In the operation of tractor connected implements, it is particularly desirable to provide power operated adjusting and lifting mechanism operable from the power plant of the tractor. It is also desirable to provide stop means which can be set from the operators station on the tractor during opertaion to pre-set the point at which the implement will return after being lifted. This type of control is particularly desirable with trailed behind implements. In the past various means have been provided for some of the desired controls such for example as shown in my Reissue Patents 22,932 and 22,006. Such systems have been termed "touch control," "follow-up," "pre-selected," and "indexing." Such controls are very significant in the operation of tractor mounted equipment, as the steering, and manipulation of the other controls, such as the clutch, brake and throttle on modern high speed tractors require most of the operators attention, and allow little time to hold a conventional fluid control valve and watch the movement of an implement to determine the desired working position.

A principal object of the present invention is to provide an improved hydraulic control system for tractors having implements connected thereto, and adjustable with respect to the tractor or to an associated implement part. Another object is to provide for such a system, using a plain simple single or double acting cylinder with only one or two hoses respectively and no other telegraphic or other devices on or connected to the cylinders, means to pre-select, set and or adjust a stop position to which the piston of the cylinder can be accurately returned. Another subsidiary object is to provide such a device in which different size cylinders may be used interchangeably.

Another object is to provide a stop or stroke unit for the hydraulic motor of hydraulic systems which can be supplied as a conversion unit for existing hydraulic systems.

Another object is to provide a stroke control device with a stop means which may be over-ridden after a preliminary stop. A subsidiary object is to provide a stroke control unit operable to provide a high resistance to fluid flow at an intermediate point with a restricted fluid flow by-pass to permit further flow at a reduced rate at an increased pressure. Another object is to provide a stroke control device with an intermediate restriction which can be over-come after a temporary restriction after which there is no restriction whereby the stop is operating from either direction of flow.

The above object and others which will be apparent from the detailed description to follow are accomplished by a construction such as shown in the drawings in which:

Figure 6 is a side elevation of the rear portion of a tractor with one wheel removed, showing an implement flexibly connected to a tractor and a power lift system incorporating one modification of applicant's invention.

Fig. 7 is a side elevation of the rear portion of a tractor with one wheel removed showing an implement secured to a tractor in trailing position and a power lift system for controlling the implement incorporating a two valve type of control unit.

Figure 8 is a diagrammatic view similar to Figure 1 with a different type of over-ride construction.

Figure 9 is a detailed enlargement of the over-ride valve construction of Figure 8.

Figure 10 is another detailed enlargement of a modification of the over-ride valve of Figure 8.

Figure 11 is a diagram similar to Figure 8 showing a modification having only one control valve and with a selector valve built into the control unit.

Figure 1:
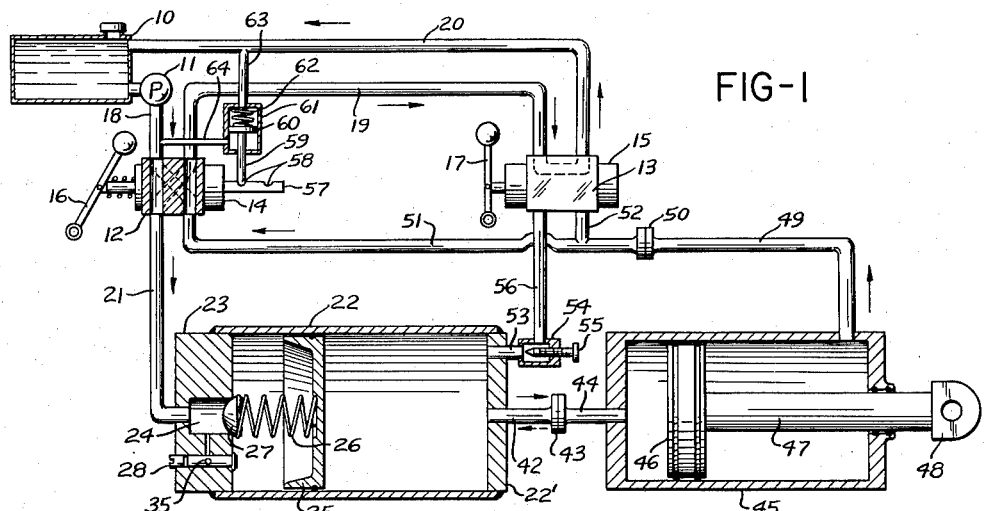
Figure 1 is a diagram showing the functional elements of one modification of the invention.

In the drawings, Figure 1 illustrates diagrammatically a fluid reservoir 10 to which a fluid pump 11 is connected. Said pump discharges fluid, in this case hydraulic oil, through a conduit 18 to a valve structure 12 which is a conventional four way valve having four ports, a second valve structure 13 of the same type being also provided. The valve structures 12 and 13 are of the spool type and have respectively spools 14 and 15, and control levers 16 and 17.

Figure 2:
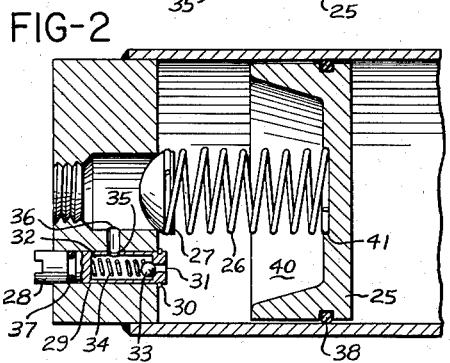
Figure 2 is a sectional view of the over-ride valve structure of Figure 1.
Figure 3:
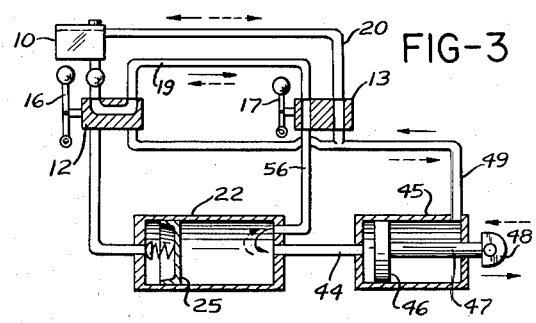
Figure 3 is a diagram showing fluid flow during adjustment of the stop location in the system of Figure 1.

From the discharge port of the valve structure 12, as shown in the valve position of Figure 3 fluid is discharged through a conduit 19 to the inlet port of the valve structure 13. A return conduit 20 connects the valve structure 13 at its discharge port with the reservoir 10. The valve structure 12 is connected by a conduit 21 with a control unit having a cylinder portion 22, a base portion 23 and a head portion 22'. The base is provided with a bore 24 arranged on the axis of the unit, which opens to the inside and is connected to the conduit 21. A piston 25 which may be closely fitted to prevent the flow of fluid or may have a sealing ring as shown in Fig. 2, is positioned for reciprocation in the cylinder portion 22 of the control unit.

A spring 26 carries secured thereto a valve 27 having a spherical head portion adapted to fit into the open end of the bore 24 as a valve seat to block the flow of fluid therethrough in one direction. A small valve member 28 is fitted in a bore 29 formed through the base 23 being held against outward movement due to internal pressure by a snap-ring 30. A small bore 31 in the member 28 communicates with a larger internal bore 32, a check valve 33 being held on the seat at the juncture of the two bores by a spring 34. A small lateral bore 35 formed in the member 28 provides a by-pass between the bore 32 and the base, and also a by-pass in one direction between the interior of the control unit at that end and the conduit 21, while acting as a check valve to prevent flow in the opposite direction. Such flow is provided for by unseating of the valve 27 against its supporting spring 26. By turning the valve member 28, the area for flow may be varied by moving the ports 35 and 36 out of aligned registration thereby varying the restriction to flow after the free piston 25 moves to seat the valve 27 which it carries at the entrance of the port or bore 24. The member 28 is provided with an O-ring seat 37 and the piston 25 may be fitted with an O-ring seal 38. Said piston is shaped with a recess 40 to give compression clearance for the spring 26 which is secured to the piston by having its end turn snapped into an undercut annular recess 41 formed in the face of the piston.

A conduit 42 connected with the head 22' is connected by a conventional self sealing break-a-way coupling 43 to a conduit 44 which is in turn connected to the head of a conventional double acting cylinder. Said cylinder has a working piston 46, a force applying piston rod 47 and a connecting end 48. A return conduit 49 connected to the cylinder 45 at the other end is joined by a conventional self sealing break-a-way coupling 50 to a conduit 51 which is connected to the fourth port of the valve structure 12. A conduit 52 connects the conduit 51 with one port of the valve structure 13. A conduit 53 is connected to the head 22' of the control unit which communicates with a valve chamber 54 into which a needle throttle valve 55 operates to provide a variable restriction. A conduit 56 leads from the valve chamber 54 to another port of the valve structure 13.

The valve spool 14 has an integral extension 57 in which two notches 58 are formed. Said notches are engageable by a latch plunger 59 carried on a piston 60 reciprocable in a chamber 61. Above the piston 60, a pressure balancing conduit communicates with the low pressure return line 20. A spring 62 above the piston 60 normally urges it downwardly into engagement with the extension 57. A conduit 64 connected between the conduit 18 and the chamber 62 provides for the transmittal of pressure to un-latch the valve when a pre-determinable pressure as regulated by the spring 62 is built up on the high pressure side of the system.

Figure 5:
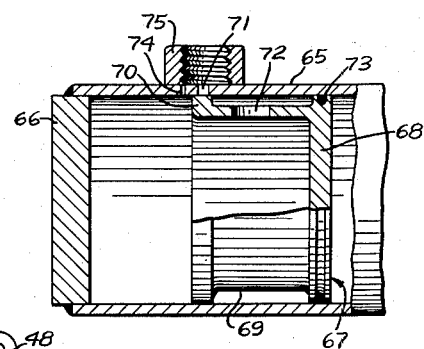
Figure 5 is a sectional view showing a modification of the over-ride valve of the system of Figure 1.

Figure 5 shows a modification in which a control unit having a cylinder 65 and a base 66 is provided with an inlet 75, to be connected to the conduit 21, in the form of a threaded nipple welded to the cylinder at a point spaced from end. A relatively long piston 68 is formed with an annular recess 69 leaving a land at one end for a sealing O-ring 73 and a flow control land 70 at the other end. An opening 72 provides free communication between the recess 69 and the interior of the piston. As shown the land 70 is adapted with movement of the piston to pass over a port 71 formed in the cylinder wall and communicating with the nipple 75. A small bleed opening 74 is spaced a sufficient distance from the bore 71 to provide at all times a restricted communication between the conduit 21 and the control unit at the end of the piston shown in Fig. 5.

As shown in Figure 1, the valve spool 14 is in a manually selected position to deliver fluid as shown in solid lines to the left end of the control unit. The valve 27 would be unseated and the free piston would move with pressure the same on both sides to the right with fluid flowing through the conduit 42 and the conduit 44 to the cylinder 45 moving the piston to the expanded position which is usually the position for lifting an implement when such a device is used as a power lift on a tractor. One essential of a system of hydraulic stop control of the type under consideration is that the displacement capacity of the control unit must be equal to the displacement capacity of the largest cylinder which is to be used with it. It is an important feature however that any power cylinder of smaller displacement may be used and controlled effectively. When the operation just described is taking place the valve spool 15 is in position to by-pass fluid to the reservoir. When the piston 46 reaches the end of its stroke to the right pressure builds up in the valve chamber 61 overcoming the pressure of the spring 62 and moving the piston 60 to release the latch 58. The valve spool being spring biased to neutral position then pops back to neutral position. Although not clearly shown in the diagram, the valve may be of the spring biased to neutral position type which is in common use.

To drop the working piston and piston rod to working or stroke controlled stopped position, the valve spool 14 is moved to a position of adjustment with the flow crossed as shown in dotted lines in Fig. 1 and the latch 59 engages in the other notch 58 holding the valve in that position. Fluid flows through the conduits 51 and 49 to the cylinder 45 moving the piston to the left and forcing fluid through the conduit 44 and 42 to the right end of the control unit. The free piston which had been to the right a distance equivalent to the displacement of the piston 46 then moves back to the left to the position shown in Fig. 1, when the valve 27 abuts the bore opening in the base 23 blocking the flow of liquid out of the control unit back through the conduit 21 to the reservoir. The by-pass restriction through the bores 36, 35, and 31 is such that with the volume of flow delivered by the pump 11, pressure is rapidly built up in the conduit 18 to release the latch 58 and thereby return the valve to neutral position. Although a latch type valve has been illustrated with a spring biased return to neutral has been shown and is particularly effective for this device, a simple manually operated valve may be used with the operator merely releasing the valve when relief pressure is built up in the system. After the stop or stroke control position is reached, it is often desirable to over-ride the stop without changing it. This the operator may do by again opening the valve to deliver fluid under pressure to the right hand side of the piston 46. Fluid is then by-passed around the valve 27 through the valve member at a reduced rate until the desired position of over-ride is reached. This movement may continue until the entire over-ride range provided is utilized. In actual practice, it has been found that one inch of over-ride on the largest power cylinder used is sufficient, more being then obtained with cylinders of smaller diameter. The control unit should have a displacement without the over-ride for the largest cylinder to be metered or used.

The adjustment of the stop position or stroke control is illustrated with Fig. 3 in which the valve spool of valve 12 is in neutral positon with the spool of valve 13 in position to deliver fluid under pressure to the space between the piston 25 and the piston 46. This space is a very significant part of the invention as it contains a trapped quantity of liquid which is merely shuttled back and forth during lifting and returning to a stopped or over-ride position.

With the free piston 25 of the control unit in the stop position as shown in Fig. 3, the quantity of trapped liquid between the two pistons 25 and 46, may be altered by moving the piston 46 in either direction with the valve 13. This is accomplished to move the piston 46 to the right by delivering additional fluid thru the conduit 56 with flow in the direction of the solid arrows as shown. To reduce the amount of trapped liquid between the pistons 25 and 46, flow is reversed as shown in dotted line arrows to move the piston 46 to the left. To provide for accurate adjustment a throttle valve 55 is put in the line being adjustable to regulate the rate of flow and the rate of movement of the piston 46. It is obvious that the lines 49 and 51 would not be used with three-way valves and a single acting cylinder. Functioning of the device is otherwise identical. Load on the piston 46 being effective to return the piston 25 to stop position and to over-ride the stop.

The resistance of the by-pass valve may be altered by rotation of the member 28 to suit conditions of oil viscosity and rates of flow, also to provide a cushion drop rather than a stop when desired. It may be opened to allow full movement to a positive stop when over-ride is not to be used.

Figure 4:
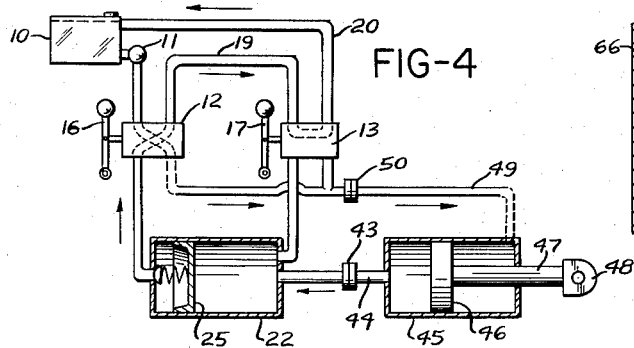
Figure 4 is a diagram showing lifting movement in the system of Figure 1.

Figure 4 shows the direction of flow with arrows when the working cylinder is being contracted with the free piston 25 dropped to stop position.

In Figure 5, the preliminary stop is provided by passage of the land 70 over the bore 71. The bleed 74 permits over-ride at a restricted rate until the port 71 is again uncovered after which full rate movement can be used to the end of the over-ride. This modification differs primarily in that it is free after a momentary restriction, the piston is free for continued movement and further in that it is symmetrical as the stop functions the same coming back from the other direction during lifting. After over-riding, the stop or stroke control position may be rapidly and accurately regained from the over-ride position.

Having described the diagrams of Figs. 1 to 5, a showing of how the hydraulic system will be utilized is shown in Figs. 6 and 7. The parts as previously described where they are shown in Figs. 6 and 7 have the same reference characters. In Fig. 6 a portion of a tractor is shown which has a frame 76, a gasoline tank 77, a rear axle housing 78, and rear drive wheels, one of which 79 is visible. An operator's seat or station 80 is supported on the main frame 76. A supporting structure 81 extending upwardly from the frame at the rear of the tank supports a steering column 82 on which a steering wheel 82' is mounted. An implement support in the form of a plow beam 83 is pivotally connected to a draft frame or bracket 84 connected beneath the frame 76 at a forward point. The beam 83 is illustrated as carrying a moldboard plow 85. A plow depth gauge wheel 86 carried on a crank arm 87 is pivotally connected to the plow beam at 88. A cylinder 45 for lifting, lowering and adjusting the plow 85 is connected to the arm 87 and to a bracket 89 connected to the beam 83.

A control valve 90 as will be further described in connection with a modification is mounted on the structure 81 and is provided with a control lever 91 located within reach of the operator. The inlet and outlet ports of the valve 90 are connected respectively to the conduits 18 and 20 leading to the pump and reservoir. It is to be understood that the pump 11 is driven by any suitable means from the power plant of the tractor.

A stroke control unit 93 is mounted vertically at the rear of the frame 76 is connected by a conduit 95 to one port of the four-way valve 90 and by a conduit 94 with the coupling 43. A selector valve pedal 96 extends forwardly from the control unit 93 where it can be readily engaged and operated by the operator's heel.

Another typical installation is shown in Fig. 7, this being the modification described in Figs. 1 to 5. All of the corresponding tractor parts bear the same numbers as in Fig. 6 and all of the hydraulic parts are identified as in Figs. 1 to 5. The implement includes a beam 97 connected at 98 to a drawbar 99 rigidly connected to the frame 76 and carries a moldboard plow 100. A frame member 101 connected to the beam 97 supports a castor axle 102 which carries a tail wheel 103. A plow supporting and gauging wheel 104 is carried on a cranked support 105 which is in turn pivoted on a bracket 107 upstanding from the beam 97. A lifting, lowering and adjusting cylinder 45 is connected between the bracket support 105 and to an upstanding bracket 108 carried on the beam 97.

The implement of Fig. 7 is representative of the type of trail behind tool which can be pulled by a tractor and lifted, lowered and adjusted by a hydraulic cylinder as described in detail in Figs. 1 to 5. The power ram or cylinder remains on the implement when it is removed from the tractor and the self sealing break-a-way couplers are disconnected. Such couplers are usually of the automatic type and are used on farm equipment to prevent any damage when an accidental disconnection occurs between the implement and tractor. Any tool may be substituted for the plow shown by merely connecting the hitch and joining the couplers. Often it may happen that one tool is disconnected with the cylinder at one end of its stroke and another is connected with its control cylinder at the other end of its stroke. The phasing constitutes no problem with the modification shown in Figs. 1 to 5 as if the free piston 25 does not hit a stop position on the first drop with valve 12, the cylinder is lifted or expanded with adjusting valve 13 and dropped again with valve 12 to contracted stop or stroke control position. If the working cylinder 46 does not hit the stop, the same action is repeated until it does. With a very small power or working cylinder as compared to the metering displacement of the control unit, it may be necessary to repeat this cycling several times while with a cylinder of near the same displacement the stop will always be hit the second cycle. So long as the same cylinder is connected no further phasing is ever necessary. The hydraulic system then becomes a universal one as any of the standard size cylinders either single acting or double acting may be used interchangeably. Even those which are now supplied with electric telegraph and magnetic stop moving means and those with manual set stops on the cylinder may be connected to a tractor with the system of this invention and controlled in the same manner as plain cylinders. It is only necessary to have the one control unit on the tractor for any number of implements with plain low cost control cylinders.

In the modification of Figures 8 to 10, the valve and other parts identical to the form shown in Figs. 1 to 5 bear the same reference characters. The control unit of this form designated in its entirety as 109 has a cylindrical barrel 110, a base end 111 and a head end 112 which may be connected to the barrel by any fluid tight means as by welding. The head 112 is connected to the conduits 56 and 42 previously described.

The base 111 is provided with a cylindrical chamber 113 coaxial with the barrel 110. At the outer end of the chamber 113 a threaded connection is provided for connection of the conduit 21. At its inner end the chamber is provided with a bore 114 of reduced diameter with a narrow wall section so that the bore is of short length, a suitable proportion for pumps of 12 g.p.m. being three eights in diameter and one eighth inch in length. A piston 114 mounted for free reciprocation in the barrel 110 may have an O-ring seal 115. A small diameter pin which may be somewhat resilient for aligning purposes carried coaxially the piston carries a generally spherical valve head 118 which closely fits the bore 114.

In operation which is similar to the form of Figures 1 to 5, when the free piston 114 moves towards stop position the valve head 118 approaches and enters the bore 114 being guided by its shape to take care of the slight axial mis-alignment which might occur. The area for flow of liquid out of the control unit between the bore and the valve head is rapidly reduced until the pressure build-up in the system unlatches the valve spool 14. The exact clearance between these two cooperating parts depends on the average viscosity of the oil, the rate of pump delivery, the nature of the latch and the tightness or looseness of over-ride desired. To over-ride it is only necessary to manually hold the valve 12 in delivery position against the by-pass valve with which all hydraulic systems are provided, slowly moving the valve head over the restriction hump. After this point is passed the over-ride may be moved at any rate which can be accomplished by the control valve 12. To come back to the stop position from over-ride it is only necessary to reverse the valve 12 to expand the cylinder. The free piston 115 moves to the right and the valve head 118 enters the bore 114 from the other side. As these parts are symmetrical in this respect, the action is identical. The shape of the valve head 118 and the length of the bore 114 are so proportioned that lag is provided for pressure build-up and latch operation so that the stop position will be the same when approached from either side.

In enlarged Fig. 9 a check valve 119 is shown positioned in a bore 120 and abutting a smaller bore 121 communicating with the chamber 113. Another small bore 122 communicates with the bore 121 and with the space at the end of the barrel 110. A spring 123 urges the check valve 119 into closed position when the piston is moving to stop position but allows fluid by-pass when the piston is moving to the right from an over-ride position thereby eliminating any block or stop on the return. In some cases this modification is useful where a complete lift with no stop at the selected position is desired.

Figure 12:
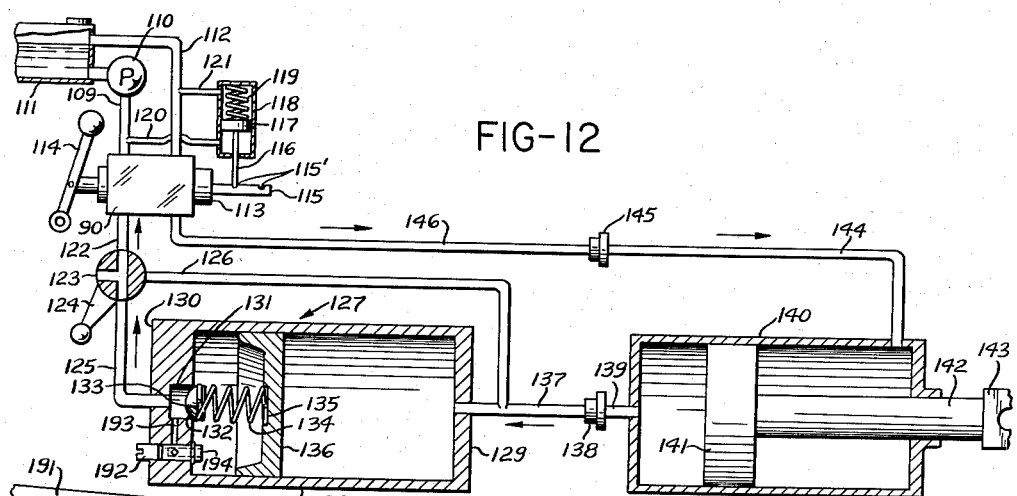
Figure 12 is a diagram showing a system with one control valve and with a selector valve.

Figure 10 shows a modification in which blocker valve 124 of uniform diameter is provided. After the initial stop, there is the same continued resistance during the entire extent of the over-ride. As with this modification a cushion drop can be provided, an adjustable valve 125 may be provided to regulate the rate of by-pass through a passage 126 between the chamber 121 and the space at the left of the barrel. Optionally the check valve 119 may be employed with or without the valve 125. Another modification is shown in Figures 12 to 15 with a slightly different version shown in less detail in Fig. 11. In these forms a single control valve 90 as shown in Fig. 6 is used with a selector valve to be here-in-after described for adjusting. In Figure 12 the control valve 90 which is of the conventional four-way type has a port connected with a conduit 109 leading to a pump 110 communication with a reservoir 111. A conduit 112 leads from the low pressure return port of the valve to the reservoir. The valve 90 has a spool 113 operable by a control lever 114 and is of the widely used type being spring biased to neutral position. An extension 115 on the spool 113 has two notches 115' either of which is engageable by a latch plunger 116 to hold the valve spool in either of its two fluid delivering positions. The plunger is carried on a piston 117 mounted for reciprocation in a closed cylinder 118. A conduit 120 joins the cylinder 117 below the piston with the pump pressure conduit 109 and a conduit 121 joints the cylinder 118 with the low pressure return conduit 112. This construction is representation of a number currently used for returning a latched valve to neutral position with a predetermined pressure build-up at a selected location in the system.

One of the two delivery ports of the valve 90 is connected by a conduit 122 to a selector valve 123 of a three-way type and having a manually operable control member 124. A conduit 125 and a conduit 126 lead from the valve 123. Said control member 123 is provided with passages to provide communication between the conduits 122 and 125 with the member in the position of adjustment shown and to provide for communication between conduits 122 and 126 in another selected position of the member 124. A stroke control unit 127 has a cylindrical barrel 128, a head 129 and a base 130. Said base has an inwardly opening chamber 131 connected to the conduit 125. The edge of the chamber 131 forms a valve seat 132 against which a valve member 133 is engageable. The member 133 is carried by a spring 134 which is snapped into a recess 135 formed concentric in a piston 136 mounted for free reciprocation in the barrel 128.

A conduit 137 connected to the head 129 is connected both to the conduit 126 and to a self-sealing break-a-way coupling 138. A conduit 139 connects the coupling with a cylinder 140 which has a working piston 141 carried on a piston rod 142. A connection 143 provides for attaching this cylinder and piston device to a load to be adjusted. Any type of reversible hydraulic motor could be utilized. A conduit 144 connected to the cylinder 140 is connected with a second self-sealing break-a-way coupling 145 which is secured to a conduit 146 connected to the second outlet port of the valve 90.

Figures 13, 14, 15:
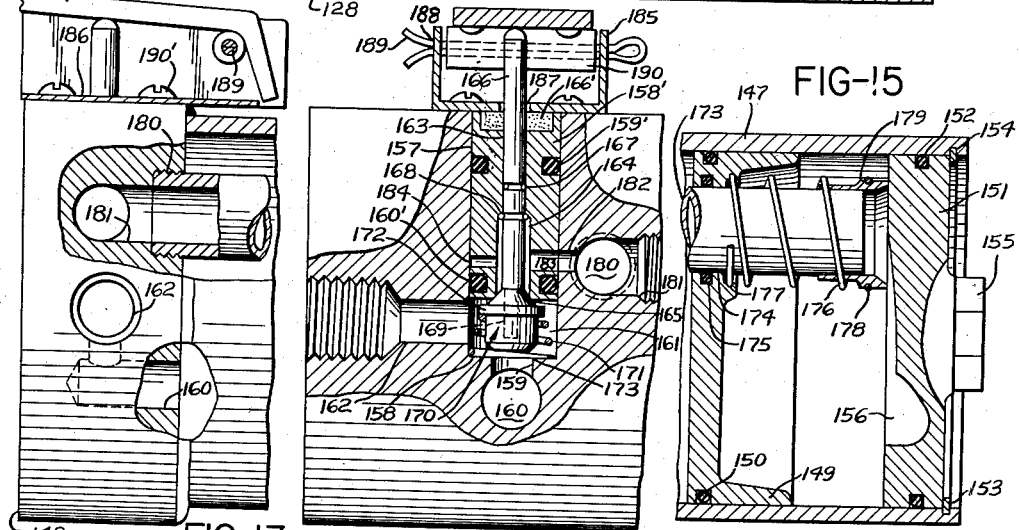
Figure 13 is a section of an actual structural unit embodying some of the functional features of Figure 12.
Figure 14 is a partial section showing additional elements of Figure 13.
Figure 15 is a section showing additional elements of the unit of Figure 13.

Figures 13, 14 and 15 shows an actual construction of a control unit of the type shown diagrammatically in Fig. 12. A cylindrical barrel 147 is secured as by welding to a base 148. A free piston 149 having a sealing O-ring 150 is inserted in the barrel 147 through the open end. This end is closed by a head 151 having an O-ring seal 152. An internal annular recess 154 formed in the end of the barrel provides for a removable snap ring 153. The head 151 is formed with an integral outward extension 155 of a hexagonal shape to provide means for rotating the head. A recess 156 is formed on the otherwise flat inside face of the head.

The base 148 is formed with a bore 157 extending in from one side, terminating in a flat end 158 from which a bore 159 extends coaxially and joins with a bore 160 extending inwardly into the barrel. A valve cage 158' spaces O-ring seals 159' and 160' is fitted in the bore 157 being flush with the top and terminating a substantial distance from the bottom to provide a valve chamber 161. A conduit 162 threaded at its outer end communicates with the valve chamber 161.

The cage 158 has an axial bore 163 at its upper end communicating with a felt wiper seal recess 166'. A larger coaxial bore 164 at the lower end of the valve cage provides at its terminal end a valve seat 165.

A valve stem 166 slideably mounted in the bore 157 has an O-ring seal 167 and a snap ring retainer 168 which abuts the shoulder formed by the bores of different diameter to hold the stem against outward movement. The lower end of the stem 166 has a reduced diameter end 169 which fits into a bore formed in a molded nylon plastic valve 170. Said valve has a conical upper seat adapted to be held against the seat 165 by a spring 171 abutting a flange 172 on the valve and the bottom of the bore 157. The bottom of the valve 170 is formed with a conical seat adapted to engage a seat 173 formed at the juncture of the bore 159 with the bottom 158 of the bore 157, when the valve is depressed.

A transfer tube 173 extends through a bore 174 in the piston 149 eccentric to the axis and terminates a distance below the head to permit unrestricted oil flow. An internal recess formed in the bore 174 in the piston carries an O-ring seal 175. A compression spring 176 has one end snapped into a recess 177 formed in the piston concentric with the bore 174. At its other end the spring 176 is snapped into a retaining recess 178 formed in a cylindrical valve 179 slideably mounted on the transfer tube 173. Said valve is adapted to fit against the inner face of the head 151 to block flow between the end of the transfer tube and the head, to the extent determined by the position of the recess 156 with respect to the valve 179.

At its other end the transfer tube is secured as by threading into a bore 180 formed in the base. Said bore communicates with a bore 181 extending to the side of the base and threaded for conduit or hose connection. A smaller bore 182 coaxial with the bore 181 extends to the bore 157 and is adapted to register with one of different size bores 183 and 184 formed in the valve cage 157. The cage may be assembled with either of these bores in registration.

The valve cage 157 is retained in position by a bracket having a bottom portion 186 and spaced upstanding side portions 185. An opening 187 fits over the stem 166. Aligned openings 188 in the portions 185 provide for a pin or cotter key 189 which extends through a tube 190 secured to an actuating lever 191. Said lever has an operation portion abutting the outside end of the valve stem. Screw 190' secures the bracket to the base 148.

Referring to Figure 12, a valve 192 illustrates in this otherwise diagrammatic view means to regulate the rate of by-pass. Said valve has a passage 194 extending coaxial and then laterally to communicate with a bore 193 formed in the head 130. By turning the valve 192 the restriction is varied. This corresponds to turning the head in the modification of Fig. 15.

Figure 16:
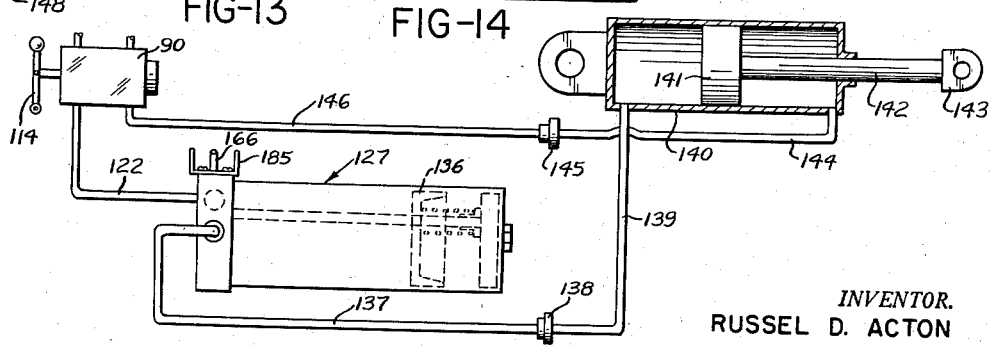
Figure 16 shows an elevation of a unit having the structure of Figures 13, 14 and 15 embodied in a hydraulic system.

Diagram of Fig. 16 shows a typical installation of the control unit of Figs. 13, 14 and 15. The piston is shown at the stop or stroke control end. In operation this unit functions the same as the unit shown in the diagram. In Figure 12 the solid arrows show fluid being delivered to the remote cylinder to retract it which normally corresponds to lowering an implement. When the position is reached as shown, the valve 133 as carried by the piston engages the seat 132 thereby building up pressure in the system and unlatching the valve spool 113 to return to neutral. This gives a fixed stop position on each cycle of operation due to the fixed volume of trapped liquid between the pistons 136 and 141. If it is desired to over-ride the stop position without changing the setting the valve 90 is manually held moving the piston 141 and the synchronized piston 136 an amount and distance determined by the flow of liquid past the restriction determined by the adjustment of the valve 192.

When it is desired to change the stop position the valve 124 is turned after the stop is reached to a position blocking conduit 125 and putting the conduit 126 in communication with the conduit 122. By manual operation of the valve 90, the operator is able to reduce or increase the volume of trapped liquid between the two pistons and to thereby select a new position of the piston 141 which will be its stop position after the valve 123 is returned to the illustrated position.

Referring to Figs. 13 to 16 the operation is the same as described, the only basic difference being that the selector valve is built in as an integral part of the base and the restrictor valve is a part of the head. As shown for reaching stop position fluid is delivered through the conduit 146, the coupling 145 and the conduit 144 to the cylinder 140 moving the piston therein to discharge fluid through conduit 139, coupling 138 and conduit 137 to the base conduit 162. With the valve in the position shown fluid passes through the conduits 162, 159 and 160 to the inside of the barrel beneath the piston 149 moving said piston until the valve 179 engages the face of the head 151. Pressure is then built up providing a stop. An adjustable leakage is provided by the position of the recess 156 with respect to the valve 179. The over-ride may be hard, soft, a cushion drop or may be eliminated by opening the recess so that an appreciable resistance is set up by engagement of the valve 179.

With the cylinder in stop or strike control position a change may be made in the setting of the stop by depressing the lever to close fluid passage through conduit 160 and to provide for fluid flow through conduit 173 into the trapped liquid space between the two pistons. If it is desired to have throttling action during this adjustment, the valve cage may be set with the small bore 184 in registration with the conduit 182.

It is to be understood that the several modifications shown illustrate only certain variations in structure and that applicant claims as his invention all structures and means for obtaining the same functions which fall within the scope of the appended claims.

What is claimed is:

1. A hydraulic power device comprising a source of fluid under pressure, valve structure communicating with said source, a stroke control unit including a closed cylinder and a piston dividing the cylinder into two chambers, conduit means communicating with each chamber and with the valve structure, said valve structure including means to selectively deliver fluid under pressure to either chamber, an independent hydraulic motor, and conduit means connecting said motor with one of said chambers.

2. A device as set forth in claim 1 in which flow restricting means is provided in the conduit means to one of the chambers whereby slow movement of the motor is obtainable.

3. A device as set forth in claim 1 in which flow restricting means is provided in the conduit means to one of the chambers operable by predetermined movement of the piston in one direction to provide for slowing down movement of the motor.

4. A device as set forth in claim 3 in which the valve structure includes a valve, a latch operable to hold the valve in fluid delivering position, and fluid pressure responsive operable means in one of the conduit means to release the latch.

5. For a hydraulic system having a source of fluid under pressure, a valve structure and a hydraulic motor, a stroke control unit including a closed cylinder having two chambers separated by a movable partition, conduit means for connecting one chamber to the hydraulic motor and conduit means to connect each chamber to the valve structure.

6. A device as set forth in claim 5 in which flow restrictor means is provided engageable by the partition in one direction of movement for slowing down movement of the partition and the hydraulic motor.

7. For a hydraulic power control system having a source of fluid under pressure, a valve structure including means to selectively deliver liquid to two outlets and a cylinder and piston device, a stroke control unit including a closed cylinder with a free piston therein providing two chambers, means for connecting each of the chambers with an outlet of the valve structure, and means adapted for connecting the cylinder of the cylinder and piston device to one of the chambers.

8. A device as set forth in claim 7 in which a flow restrictor means is provided operable by a predetermined movement of the free piston in one direction.

9. For a hydraulic control system having a source of fluid under pressure, a valve structure and a piston and cylinder device, a stroke control unit including a cylinder having a free piston therein forming two chambers, means for connecting one chamber to the valve structure, means for connecting the other chamber to the cylinder and means to bypass the free piston and connect the two chambers together.

10. A hydraulic stroke control for the working cylinders of hydraulic systems having a valve structure comprising a control unit including a cylinder closed at each end, a free piston mounted for reciprocation in said cylinder, means to connect each end of said cylinder to the valve structure and means to connect one end of said cylinder to a working cylinder.

11. A device as set forth in claim 10 in which valve means is carried by the free piston, said valve means being operable to block flow of fluid from the stroke control unit after a predetermined movement of the free piston in one direction.

12. A device as set forth in claim 11 in which a restricted bypass is provided around the valve means whereby the free piston moves at a reduced rate after blocking of the flow.

13. A device as set forth in claim 10 in which the free piston is provided with a narrow land and in which an outlet from the cylinder at one end is in the wall of the cylinder whereby said land provides a flow blocking means operable as the piston passes over the outlet in either direction.

14. A device as set forth in claim 10 in which the stroke control cylinder is provided with a bypass chamber at one end formed with a reduced opening communicating with the interior of the cylinder and in which the free piston is provided with a blocker valve operable to enter said opening as the piston nears the end of its stroke at that end to provide a blocking action to fluid flow.

15. A device as set forth in claim 14 in which the blocker valve is formed with an enlarged head whereby after said head has passed through the reduced opening full flow again takes place and whereby the same blocking action takes place during withdrawing of the blocker valve.

16. A device as set forth in claim 14 in which a check valve bypass is provided around the reduced opening whereby fluid restriction is effective only in one direction of movement of the free piston.

17. A hydraulic power control device comprising a source of liquid under pressure, a first valve means connected to said source, a second valve means connected to said source, a stroke control unit including a cylinder closed at both ends, a free piston mounted for reciprocation in said cylinder, means to connect one end of the cylinder to one valve means, means to connect the other end of the cylinder to the other valve means, a working cylinder having a piston therein, and means to connect said cylinder to one end of the first named cylinder.

18. A hydraulic power control device for a system having a source of fluid under pressure and a control valve connected thereto and a working cylinder comprising a stroke control unit including a control cylinder closed at both ends and a free piston in the cylinder fluid conduit, means to connect one end of the cylinder to the control valve fluid control, means to connect the other end of the control cylinder to the working cylinder and selector valve means including fluid conduit means operable to bypass the free piston and connect the control valve directly to the working cylinder.

19. A stroke control unit for hydraulic systems having a valve structure for delivering fluid and a working hydraulic motor, comprising a cylinder, a base secured to the cylinder, a transfer tube secured to said base and extending to the other end of the cylinder, a free piston mounted for reciprocation with respect to the cylinder and sealed against fluid flow with respect thereto, a head mounted on the cylinder, said base being formed with a first fluid passage communicating with the valve structure and with the transfer tube and a second fluid passage communicating with the working cylinder and with the interior of the cylinder at that end and manually operable valve means for blocking flow to the cylinder at that end and for putting the first and second passages in communication for bypassing the piston.

20. A stroke control unit for hydraulic systems having valve structure for delivering fluid and a working hydraulic motor, comprising a cylinder, a base secured to the cylinder, a transfer tube secured to said base and extending through the cylinder offset with respect to the center, a free piston mounted for reciprocation with respect to the cylinder and transfer tube and sealed against fluid flow with respect thereto, a head rotatably mounted in the cylinder with its inside spaced from the end of the transfer tube, said base being formed with a first fluid passage commmunicating with the valve structure and with the transfer tube and a second fluid passage communicating with the working cylinder and with the interior of the cylinder at that end and manually operable valve means for blocking flow to the cylinder at that end and for putting the first and second passages in communication for bypassing the piston.

21. A device as set forth in claim 20 in which spring means is secured to the piston at the head side and in which valve means is carried by said spring means positioned to partially close the space for fluid flow between the end of the transfer tube and the head.

22. A device as set forth in claim 20 in which an annular valve is slideably mounted on the transfer tube at the head side of the piston and is resiliently secured to the piston to move therewith until it engages the head.

23. A device as set forth in claim 22 in which the head is rotatable and is formed with a bypass recess movable with respect to the valve to obtain variable restriction to bypass.

24. In combination with a tractor having a power plant and an implement removably connected thereto and having a part to be adjusted, a pump driven by the power plant of the tractor, a reservoir, valve structure, conduits connecting the pump, the reservoir and the valve structure, a stroke control unit mounted on the tractor and including a cylinder and a free piston therein, conduit means to connect one end of said cylinder to the valve structure, a hydraulic motor mounted on the implement and connected to the implement part to be adjusted, disconnectible conduit means to connect said motor to said cylinder, and conduit means operatively associated with said valve structure for bypassing said stroke control unit and delivering fluid directly to said motor.

25. A device as set forth in claim 24 in which the piston and the cylinder of the control unit carry cooperating valve parts operable at a predetermined point in the travel of the piston to retrict flow to cylinder.

26. A device as set forth in claim 25 in which the valve structure is provided with a pressure releasable latch means for holding it in position to deliver fluid to the control unit and in which the restriction to flow is operable to release said latch.

27. A device as set forth in claim 24 in which the piston of the control unit carries a valve element and the cylinder of the unit carries a cooperating valve part, said element and said part being so constructed and arranged with a flow restricting portion and a portion providing for flow so that at one predetermined point in the movement of the piston fluid flow is restricted, pressure is built up and the rate of movement of the piston is substantially reduced momentarily following which the restriction is removed and full flow and movement is attained.

28. In combination with a tractor having a power plant and an implement connected thereto having a part to be adjusted, a reservoir, a pump connected to the reservoir and adapted to be driven by the power plant, a valve connected to the pump, a stroke control unit having a cylinder and a free piston therein, conduit means connecting one end of said cylinder to valve, a working cylinder and piston device connected to the implement part to be adjusted, conduit means for removably connecting said working cylinder with the other end of the stroke control cylinder whereby different cylinders of different capacity may be connected, and valve controlled conduit means connected to the conduit means, the stroke control cylinder and the working cylinder for changing the volume of liquid between the two pistons.

29. A device as set forth in claim 28 in which the valve controlled means is a manually operated selector valve.

30. A device as set forth in claim 28 in which the valve controlled means includes a bypass transfer tube connected to both ends of the cylinder of the control unit and a manually operable selector valve for controlling the flow of fluid through the tube and through the cylinder.

31. A device as set forth in claim 28 in which the valve controlled means includes means for holding the piston of the control unit against movement.

32. A device as set forth in claim 28 in which flow restricting means is provided in the control unit including a fluid outlet from the cylinder and a fluid flow blocking means associated with the piston of the control unit and operable by a predetermined movement of the piston in conjunction with said outlet to reduce the rate of movement of the piston.

33. A hydraulic power control system for tractors having a reservoir, a pump and a valve structure associated with the pump and reservoir, an implement flexibly and removably connected to the tractor and having a part to be adjusted and an hydraulic ram adapted to be mounted on the implement connected to said part and including a stroke control unit adapted to be mounted on the tractor comprising closed at both ends, a free piston in said cylinder, conduit means connecting one end of the cylinder to the valve structure, conduit means connecting the other end of the cylinder to the valve structure, conduit means removably connecting the ram to one end of the cylinder, said valve structure including means to deliver fluid around the piston whereby the piston of the control unit may be moved with the ram with liquid trapped therebetween and whereby the ram may be selectively operated with the piston of the control unit held stationary to change the phase relationship of the piston with respect to the ram and to thereby change the effective length of stroke of the ram.

34. A device as set forth in claim 33 in which fluid flow restricting means are provided in one of the conduit means to the cylinder of the stroke control unit and in which means operable by movement of the piston of said stroke control unit are provided associated with said flow restricting means operable to reduce rate of movement of the piston at an intermediate point in its stroke.

35. A hydraulic power control system for tractors having a reservoir, a pump and a valve structure associated with the pump and reservoir, an implement flexibly and removably connected to the tractor and having a part to be adjusted and an hydraulic ram connected to said part and including a stroke control unit comprising a cylinder closed at both ends, a free piston in said cylinder, conduit means connecting one end of the cylinder to the vlave structure, conduit means connecting the other end of the cylinder to the valve structure, conduit means removably connecting the ram to one end of the cylinder, said valve structure including means to deliver fluid selectively to either end of the cylinder whereby the piston of the control unit may be moved with the ram with liquid trapped therebetween and whereby the ram may be selectively operated with the piston of the control unit held stationary to change the phase relationship of the piston with respect to the ram and to thereby change the effective length of stroke of the ram.

36. A device as set forth in claim 35 in which fluid flow restricting means are provided in one of the conduit means to the cylinder of the stroke control unit and in which means operable by movement of the piston of said stroke control unit are provided associated with said flow restricting means operable to reduce rate of movement of the piston at an intermediate point in its stroke.

References Cited in the file of this patent

UNITED STATES PATENTS

| | | |
|---|---|---|
| 2,402,848 | Senn | June 25, 1946 |
| 2,595,471 | Densmore et al. | May 13, 1952 |
| 2,614,536 | Livers | Oct. 21, 1952 |
| 2,637,259 | Acton | May 5, 1953 |
| 2,664,106 | Livers | Dec. 29, 1953 |
| 2,704,996 | Peterson et al. | Mar. 29, 1955 |